Patented Oct. 11, 1949

2,484,029

UNITED STATES PATENT OFFICE 2,484,029

HYDRAZINE DERIVATIVES OF PYRIDAZINE COMPOUNDS

Max Hartmann and Jean Druey, Riehen, Switzerland, assignors to Ciba Pharmaceutical Products, Inc., Summit, N. J.

No Drawing. Application December 10, 1946, Serial No. 715,352. In Switzerland December 21, 1945

11 Claims. (Cl. 260—250)

This invention relates to new hydrazine derivatives of compounds containing a pyridazine ring for example of pyridazines, phthalazines and other compounds containing the pyridazine ring.

Compounds containing the pyridazine ring are especially such which possess an aromatic nucleus which exists either as a substituent as in the aryl- or aralkylpyridazines or in condensed form, for example in the phthalazines. The aromatic nucleus may be substituted further also for example through alkyl, free or substituted hydroxy or amino groups, or halogen atoms. Besides, pyridazines are suitable which contain a heterocyclic nucleus as a substituent or in condensed form, for example, pyridopyridazines as well as pyridazines otherwise substituted, for example through alkyl or only in the ortho position to a ring nitrogen atom by a substituted or unsubstituted hydrazino group.

According to the invention, the new compounds are formed by reacting with a hydrazine, a pyridazine compound of the desired structure but containing a group in the ortho position to a ring nitrogen which is replaceable by a hydrazine radical. Examples of such replaceable groups are an esterified hydroxyl group such as a halogen, or an aryloxy or thioether group. Also, hydrazino pyridazines in which the hydrazine residue contains an unsubstituted amino group are obtained if one treats with reducing agents compounds containing the pyridazine ring which possess in the ortho position to a ring nitrogen atom a substituent convertible to a hydrazine group through reduction, as for example a nitroamino group.

As examples of compounds containing the pyridazine ring, and which may be used as starting materials in the present invention, the following may be mentioned:

1 - chloro - phthalazine, 1 - chloro - 4 - methyl - phthalazine, 1 - chloro - 4 - ethyl - phthalazine, 1-chloro-4-propyl-phthalazine, 1-chloro-4-butyl-phthalazine, 1 - chloro - 4 - benzyl - phthalazine, 1 - chloro - 7 - methoxy - phthalazine, 1 - chloro - 7,8-dimethoxy-phthalazine, 1-chloro-6-hydroxy-phthalazine, 1 - chloro - 4 - phenylphthalazine, 1-chloro-4-(p - methoxy - phenyl) - phthalazine, 3-chloro-pyridazine, 3-chloro-6-methyl-pyridazine, 3-chloro-6-phenyl-pyridazine, 3 - iodo - 6 - (p-tolyl) -pyridazine, 3 - chloro - 6 - (p-hydroxy - phenyl) -pyridazine, 1-phenoxy-phthalazine, 1- methylmercapto-4-methyl-phthalazine, 6-chloro-3-phenyl-pyrido-2',3',4,5-pyridazine, 6 - chloro - 3 - phenyl-pyrido - 3',4':4,5 - pyridazine; also 1 - nitroamino-phthalazine, 3-nitroamino-6-phenyl-pyridazines, and other nitroaminopyridazine compounds which are substituted similarly to the starting materials already named.

As hydrazines, hydrazine itself or its substitution products wherein a nitrogen atom may form part of a ring, as for example morpholine or piperidine, may be employed. Examples of suitable hydrazines are: hydrazine, methyl-hydrazine, benzyl-hydrazine, asymmetrical dimethyl-hydraine, symmetrical dimethyl-hydrazine, propyl-hydrazine, allyl-hydrazine, N-methyl-N-butyl-hydrazine, N-aminopiperidine, N-amino-morpholine, 3-methyl-cyclo-hexyl-hydrazine and the like. Also, these hydrazines may be employed in the form of their salts. The conversion with hydrazines is carried out suitably in the presence of diluents, if desired also in the presence of condensing agents, and if desired in the presence of catalysts such as copper powder.

The reduction to hydrazines according to the process for example of nitroamino compounds is carried out catalytically or with zincdust in alkaline solution.

Insofar as the starting materials such as the phthalazines or pyridazines are not known, they can be obtained from corresponding oxocarboxylic acids by reaction with hydrazine. The oxo compounds, for example, the phthalazones or pyridazones thus obtained may be converted into their chlorine compounds, for example by treatment with phosphorus oxychloride.

The compounds according to the present invention cause a marked and sustained fall of blood pressure and are useful as therapeutic agents or as intermediate products.

The invention is illustrated more particularly in the examples which follow, but it is to be understood that these examples are presented by way of illustration and not limitation. In these examples, the same relation exists between "parts by weight" and "parts by volume" as exists between grams and cubic centimeters.

Example 1

30 parts by weight of phthalazone are converted to 1-chlorophthalazine by the method described in Ber. d. deutsch. chem. Ges., vol 26, page 521 (1893). The freshly obtained yet moist chloro compound is heated on the water bath for two hours in a mixture of 100 parts by volume of ethyl alcohol and 90 parts by volume of hydrazine hydrate. Preferably after filtering, 1-hydrazino-phthalazine of the formula

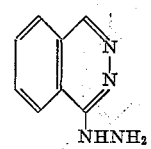

crystallizes out in yellow needles on cooling. It is filtered with suction and washed with cold ethyl alcohol. The new compound is crystallized from methyl alcohol, and melts, when rapidly heated, at 172–173° C. On warming in alcoholic or aqueous hydrochloric acid, the hydrochloride of melting point 273° C. (with decomposition) is obtained.

In place of 1-chloro-phthalazine, 1-phenoxy-phthalazine (melting point 107° C., obtained by condensation of 1-chlorophthalazine with phenol in the presence of sodium) may also be used in which case the conversion preferably occurs at a higher temperature and without dilution with ethyl alcohol.

Example 2

10 parts by weight of 1-chloro-4-methyl-phthalazine (melting point 124° C.) are added to a warm solution of 30 parts by volume of hydrazine hydrate and 40 parts by weight of ethyl alcohol and heated on the boiling water bath. After some time an intensely colored impurity in small amount begins to separate from the clear solution. After an hour, it is filtered with suction while hot and the filtrate stored in the cold for crystallization. 1 - hydrazino - 4 - methyl-phthalazine of the formula

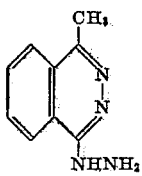

is obtained.

The new compound changes gradually on heating and decomposes completely at about 310° C. The hydrochloride melts at 285° C., with decomposition.

Example 3

5 parts by weight of 3-chloro-6-phenyl-pyridazine are heated to boiling for 6 hours in a mixture of 15 parts by volume of hydrazine hydrate and 20 parts by volume of ethyl alcohol. On cooling the clear solution deposits 3-hydrazino-6-phenyl-pyridazine of the formula

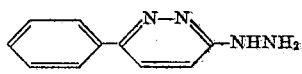

in the form of plates which are suction filtered and recrystallized from methanol. Melting point 144° C. The hydrochloride, crystallized from dilute hydrochloric acid, melts at 233° C. with decomposition; the hydrazone obtained with acetone melts at 163° C.

Example 4

10 parts by weight of 3-chloro-6-methyl-pyridazine are brought to reaction with 15 parts by volume of hydrazine hydrate in the presence of 15 parts by volume of absolute ethyl alcohol. After boiling for 2 hours, the alcohol and a part of the excess hydrazine hydrate are removed in vacuo. On cooling, 3 - hydrazino - 6 - methyl-pyridazine of the formula

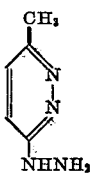

crystallizes out. It is purified by dissolving and allowing it to crystallize from chloroform and melts at 74–75° C. With alcoholic hydrochloric acid, there is obtained a hydrochloride of melting point 222° C.

Example 5

9.8 parts by weight of 1-chloro-4-(p-methoxy-phenyl)-phthalazine of melting point 147° C. obtained from 2-(p-methoxy-benzoyl)-benzoic acid (Monatshefte 30 486, 1909) through reaction with hydrazine and subsequent chlorination with phosphorus oxychloride, are heated on the water bath for two hours in 30 parts by volume of hydrazine hydrate and 40 parts by volume of ethyl alcohol. By suction filtering the hot solution, an orange colored by-product is separated. On cooling the filtrate, 1 - hydrazino - 4 - (p-methoxy-phenyl) - phthalazine of the formula

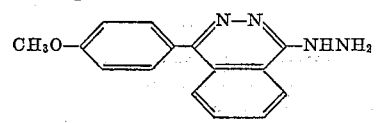

is obtained in yellow needles. It may recrystallize from toluene and melts at 174–175° C. The hydrochloride separates out from aqueous hydrochloric acid solution in needles containing water of crystallization which sinter at about 150° C. and melt at 212–213° C.

Example 6

From 5 parts by weight of 1-chloro-4-(p-dimethylamino-phenyl)-phthalazine of melting point 195–197° C., (obtained from 2-(p-dimethylamino-benzoyl)-benzoic acid [Bull. Soc. chim. France (3) 25, 168] by reaction with hydrazine and subsequent chlorination with phosphorus oxychloride), 1 - hydrazino - 4 - (p - dimethylamino-phenyl)-phthalazine of melting point 203° C. and the formula

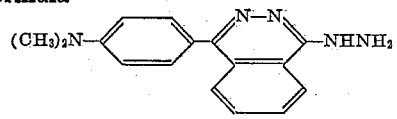

is obtained in analogous manner as in Example 5.

Example 7

10 parts by weight of 1-hydrazino-phthalazine are dissolved in 30 parts by volume of 2-normal acetic acid and treated at 60° C. with 10 parts by volume of acetone. A red oil separates out, which after a short time becomes solid. On recrystallization from acetone, the phthalazinyl-hydrazone of acetone thus obtained melts at 114° C. It corresponds to the formula

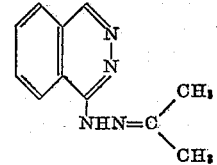

Example 8

10 parts by weight of 1-chloro-4-benzyl-phthalazine are heated to boiling for 2 hours with 30 parts by volume of hydrazine hydrate in 40 parts by volume of absolute ethyl alcohol. The reaction product crystallizes out on cooling in ice. On dissolving and recrystallizing from benzol or chloroform and petroleum ether, there is obtained 1-hydrazino-4-benzyl-phthalazine of the formula

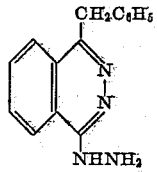

and melting point 145–146° C.

Example 9

9 parts by weight of methyl-hydrazine sulfate are suspended in 30 parts by volume of methanol containing some water and treated hot with 72 parts by volume of a 5.5 normal methanolic potassium hydroxide solution. While shaking, it is allowed to cool and the potassium sulfate which precipitates is filtered off with suction. The methanolic filtrate is evaporated to one half volume and treated with 9 parts by weight of 1-chloro-4-methyl-phthalazine. After heating to boiling for one hour, it is cooled and a small amount of by-product which is formed is filtered off with suction. The filtrate is evaporated to dryness in vacuo. From the residue, 1-methyl-hydrazino-4-methyl-phthalazine is obtained by taking up in water, precipitating with potassium carbonate solution and extraction with chloroform. Recrystallized from benzol, it melts at 145° C. It possesses probably the constitution of an asymmetrically di-substituted hydrazine corresponding to the formula

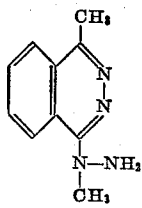

The hydrochloride has a melting point of 237° C.

Example 10

4.8 parts by weight of 1-hydrazino-phthalazine in 15 parts by volume of methanol are mixed at 60° C. with 15 parts by volume of aqueous formaldehyde solution of 40 per cent. strength and then heated to the boil for 10 minutes. Upon cooling the phthalazinyl-hydrazone of formaldehyde precipitates in the form of yellow crystals melting at 116° C.

Example 11

8 parts by weight of 1-hydrazino-phthalazine, dissolved in 100 parts by volume of warm methanol, are mixed with 8.3 parts by weight of pyruvic acid. When this mixture is heated, the reaction product of the formula

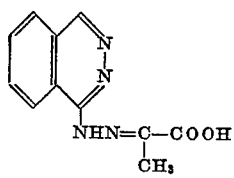

precipitates in the form of yellow crystals melting at 180° C. (with decomposition). They are easily soluble in sodium bicarbonate solution.

Example 12

4.7 parts by weight of 1-hydrazino-phthalazine, suspended in 20 parts by volume of absolute pyridine, are slowly mixed with 2.3 parts by weight of acetyl chloride while being well cooled with ice, and then allowed to stand in ice for 1 hour. The mixture is then suction-filtered. The pyridine mother liquor is concentrated by evaporation whereby a compound is obtained which crystallizes in the form of nice needles of melting point 171–172° C. and whose constitution is this:

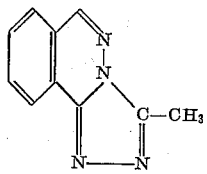

Example 13

3.2 parts by weight of 1-hydrazino-phthalazine and 12 parts by volume of formic acid of 85 per cent. strength are heated to the boil for 1 hour and the perfectly clear solution is then evaporated to dryness. The solid residue is recrystallized from alcohol, the reaction product separating in the form of little needles of melting point 190–191° C. It has this constitution:

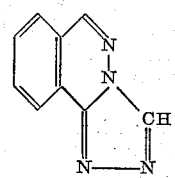

Example 14

5.2 parts by weight of 1-hydrazino-4-methyl-phthalazine suspended in 20 parts by volume of dry pyridine are mixed in the course of 5 minutes with 4.25 parts by weight of benzoyl chloride. The reaction mass evolves heat and is subsequently heated to 60° C. for 5 minutes. After cooling the mass is suction-filtered and recrystallized from acetic acid of 50 per cent. strength. The new compound melts at 212° C. It is represented by the formula

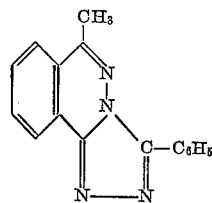

Example 15

5 parts by weight of β-benzoylpicolinic acid (melting point 148° C. obtained from quinolinic acid anhydride and benzene in the presence of aluminium chloride) are heated in 500 parts by volume of water with 2.5 parts by volume of hydrazine hydrate. The phenyl-pyridopyridazone of melting point 236° C. is converted into the chloro-compound with phosphorus oxychloride, and the 6-hydrazino-3-phenyl-pyrido-2',3':4,5-pyridazine of the formula

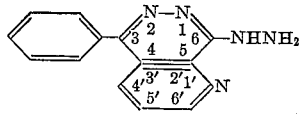

is then obtained by reaction with hydrazine hydrate in the presence of ethyl alcohol in a manner analogous to that described in Examples 1–6. The hydrochloride melts at about 220° C.

Example 16

5 parts by weight of 1-chloro-4-phenyl-phthalazine, melting at 160° C. are heated to the boil for 2 hours in a mixture of 15 parts by volume of hydrazine hydrate and 20 parts by volume of ethyl alcohol. Upon cooling the 1-hydrazino-4-phenyl-phthalazine of the formula

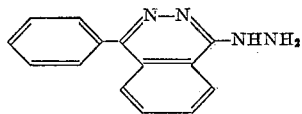

is crystallized in fine yellow needles. It may be recrystallized from benzene or ethyl alcohol of 50 per cent strength. The hydrochloride obtained with dilute hydrochloric acid is crystallized to form needles containing crystal water which melt at 89-90° C. They give off the water at 100° C. and then melt at about 290° C.

Having thus described the invention, what is claimed is:

1. Compounds containing a pyridazine ring in which a ring carbon atom in the ortho-position to a ring nitrogen of the pyridazine ring is directly connected with one of the two nitrogen atoms of a substituent selected from the group consisting of the hydrazino-group, hydrazino-groups substituted by hydrocarbon radicals and hydrazone radicals.

2. Phthalazines in which a ring carbon atom in the ortho-position to a ring nitrogen of the pyridazine ring is directly connected with one of the two nitrogen atoms of a substituent selected from the group consisting of the hydrazino-group, hydrazino-groups substituted by hydrocarbon radicals and hydrazone radicals.

3. Phenylpyridazines in which a ring carbon atom in the ortho-position to a ring nitrogen of the pyridazine ring is directly connected with one of the two nitrogen atoms of a substituent selected from the group consisting of the hydrazino-group, hydrazino-groups substituted by hydrocarbon radicals and hydrazone radicals.

4. Pyridopyridazines in which a ring carbon atom in the ortho-position to a ring nitrogen of the pyridazine ring is directly connected with one of the two nitrogen atoms of a substituent selected from the group consisting of the hydrazino-group, hydrazino-groups substituted by hydrocarbon radicals and hydrazone radicals.

5. 1-hydrazino-phthalazines.
6. 3-hydrazino-6-phenyl-pyridazines.
7. 1-hydrazino-4-phenyl-phthalazines.
8. 1-hydrazino-phthalazine of the formula

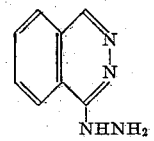

9. 3-hydrazino-6-phenyl-pyridazine of the formula

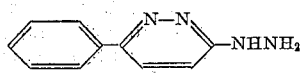

10. 1-hydrazino-4-alkyl-phthalazines.
11. 1-hydrazino-4-methyl-phthalazine of the formula

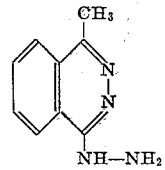

MAX HARTMANN.
JEAN DRUEY.

No references cited.